(12) United States Patent
Kudo (10) Patent No.: US 10,796,413 B2
(45) Date of Patent: Oct. 6, 2020

(54) VIDEO MONITORING SYSTEM

(71) Applicant: HITACHI KOKUSAI ELECTRIC INC., Tokyo (JP)

(72) Inventor: Tadamichi Kudo, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 22 days.

(21) Appl. No.: 16/331,047

(22) PCT Filed: Aug. 30, 2017

(86) PCT No.: PCT/JP2017/031092
§ 371 (c)(1),
(2) Date: Mar. 6, 2019

(87) PCT Pub. No.: WO2018/056002
PCT Pub. Date: Mar. 29, 2018

(65) Prior Publication Data
US 2019/0220955 A1    Jul. 18, 2019

(30) Foreign Application Priority Data

Sep. 26, 2016  (JP) .................................. 2016-187184

(51) Int. Cl.
*G06K 9/00* (2006.01)
*G06T 3/60* (2006.01)
(Continued)

(52) U.S. Cl.
CPC ............ *G06T 3/602* (2013.01); *G06T 3/4038* (2013.01); *G06T 7/11* (2017.01); *G06T 7/174* (2017.01);
(Continued)

(58) Field of Classification Search
CPC ......... G06T 3/602; G06T 3/4038; G06T 7/11; G06T 7/174; G06T 2207/20212;
(Continued)

(56) References Cited

U.S. PATENT DOCUMENTS

| 5,394,275 | A | * | 2/1995 | Iketani | ................... | H04N 5/926 |
| | | | | | | 375/E7.103 |
| 5,563,661 | A | * | 10/1996 | Takahashi | .......... | H04N 5/23245 |
| | | | | | | 348/390.1 |
| 5,633,684 | A | * | 5/1997 | Teranishi | ............... | H04N 19/63 |
| | | | | | | 375/240.11 |
| 6,480,630 | B1 | * | 11/2002 | Kondo | ................... | H04N 19/50 |
| | | | | | | 375/240.28 |

(Continued)

FOREIGN PATENT DOCUMENTS

| JP | 2004-153334 A | 5/2004 |
| JP | 2007-208796 A | 8/2007 |

OTHER PUBLICATIONS

International Search Report dated Nov. 21, 2017, for PCT/JP2017/031092.

*Primary Examiner* — Aaron W Carter
(74) *Attorney, Agent, or Firm* — Bacon & Thomas, PLLC (57) ABSTRACT

In a video monitoring system including HD and SD cameras, the system includes, on the transmitting side, a division/rotation processing unit for dividing an SD image into multiple divided images horizontally and performing a process for rotating the divided images by 90 degrees to the left, an image insertion unit for arranging and superimposing the divided images in a text telop region of an HD image, and a HD encoder for compressing and transmitting the HD image with the SD image superimposed. The system further includes, on the receiving side, a HD decoder for expanding the received HD image, and an output image processing unit for extracting the multiple divided images of the SD image and rotating these images by 90 degrees to the right, sorting and combining these images to reproduce the SD image, and outputting the expanded output HD image and the reproduced output SD image.

4 Claims, 7 Drawing Sheets

(51) Int. Cl.
*G06T 3/40* (2006.01)
*G06T 7/11* (2017.01)
*H04N 5/247* (2006.01)
*G06T 7/174* (2017.01)
*H04N 7/18* (2006.01)
*H04N 21/2365* (2011.01)
*H04N 21/431* (2011.01)

(52) U.S. Cl.
CPC ............... *H04N 5/247* (2013.01); *H04N 7/18* (2013.01); *H04N 7/181* (2013.01); *H04N 21/2365* (2013.01); *H04N 21/431* (2013.01); *G06T 2207/20021* (2013.01); *G06T 2207/20212* (2013.01)

(58) Field of Classification Search
CPC .......... G06T 2207/20021; H04N 7/181; H04N 7/18; H04N 21/2365; H04N 21/431; H04N 21/234363; H04N 5/247; H04N 5/278
See application file for complete search history.

(56) References Cited

U.S. PATENT DOCUMENTS

| | | | | |
|---|---|---|---|---|
| 6,744,822 | B1* | 6/2004 | Gaddam | H03M 13/1515 348/E5.108 |
| 9,601,156 | B2* | 3/2017 | Choi | H04N 21/4342 |
| 9,749,542 | B2* | 8/2017 | Shimbo | H04N 5/247 |
| 10,382,800 | B2* | 8/2019 | Kudo | H04N 19/40 |
| 2005/0175314 | A1* | 8/2005 | Hu | H04N 21/23406 386/344 |
| 2006/0291347 | A1* | 12/2006 | Osabe | G11B 20/1262 369/47.19 |
| 2014/0196091 | A1* | 7/2014 | Shin | H04N 21/4828 725/53 |
| 2014/0321555 | A1* | 10/2014 | Rossato | H04N 19/88 375/240.26 |
| 2016/0198202 | A1* | 7/2016 | Van Brandenburg | H04N 21/4405 725/31 |
| 2018/0077433 | A1* | 3/2018 | Kudo | H04N 19/40 |
| 2019/0220955 | A1* | 7/2019 | Kudo | G06T 7/11 |

* cited by examiner

VIDEO MONITORING SYSTEM

FIELD OF THE INVENTION

The present invention relates to a video monitoring system; and, more particularly, to a video monitoring system that can reduce costs by simplifying the configuration thereof and improve transmission efficiency.

BACKGROUND OF THE INVENTION (Description of Related Art: FIG. 7)

Conventionally, there is known a CCTV (Closed Circuit Tele-Vision) system in which an image captured by a monitoring camera is encoded by an encoder and transmitted through a transmission path such as an IP (Internet Protocol) network or the like.

In a video monitoring system such as the CCTV system, recently, in order to accurately check a disaster situation in a damaged area from an image (moving picture) or the like, it is common to encode an image taken by an HD (High Definition) compatible camera by an HD compatible encoder and transmit an HD video through a transmission path.

However, an SD image captured by a conventional SD (Standard Definition) compatible analog camera is still widely used.

Figure 7:
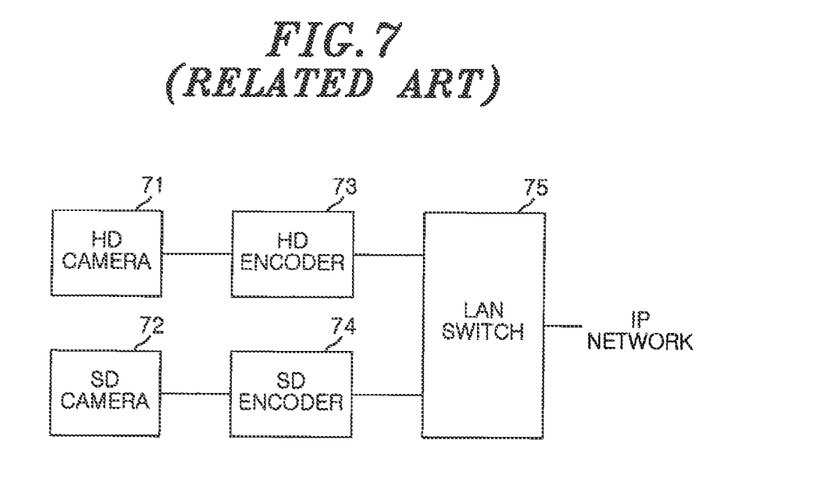
FIG. 7 explains a schematic configuration of a transmitting side in a conventional video monitoring system.

FIG. 7 explains a schematic configuration of a transmitting side in a conventional video monitoring system.

As shown in FIG. 7, the conventional video monitoring system includes an HD compatible monitoring camera (HD camera) 71, an SD compatible camera (SD camera) 72, an HD encoder 73 for encoding and compressing an image taken by the HD camera 71, an SD encoder 74 for encoding and compressing an image taken by the SD camera 72, and a LAN switch 75 for switchably connecting the HD encoder 73 and the SD encoder 74 to an IP network.

In other words, when the conventional video monitoring system includes both of the HD camera 71 and the SD camera 72, encoders corresponding thereto are required.

Similarly, on a receiving side, an HD decoder corresponding to the HD image and an SD decoder corresponding to the SD image are required to decode and expand an image.

RELATED ART

As for a conventional technique for transmitting both of an SD image and an HD image, there is known a "Transmission Method" disclosed in Japanese Patent Application Publication No. 2002-300129 (Hitachi Kokusai Electric Inc.: Patent Document 1.)

Patent Document 1 discloses therein a method in which SDTV signals of four channels are transmitted through an HD-SDI (Serial Digital Interface) cable and, on a receiver side, the SDTV signals are reproduced by extracting the SDTV signals of four channels which are multiplexed by an HDTV signal received through the HD-SDI and the SDTV signals can be transmitted through one HD-SDI cable.

Patent Document 1: Japanese Patent Application Publication No. 2002-300129

However, in the conventional video monitoring system, when both of the HD camera and the SD camera are provided, encoders/decoders corresponding to the HD image and the SD image are required. Accordingly, the configuration of the system becomes complicated, and the transmission efficiency deteriorates.

SUMMARY OF THE INVENTION

In view of the above, the present invention provides a video monitoring system, including both of an HD camera and an SD camera, capable of simplifying the configuration thereof and improving transmission efficiency in the system.

In accordance with an aspect of the present invention, there is provided a video monitoring system including an HD camera configured to capture an HD image and an SD camera configured to capture an SD image, the system comprising: on a transmitting side, a transmitting-side image processing unit configured to divide the SD image into a plurality of images and insert the divided images into a text telop region of the HD image, and an HD encoder configured to compress and output the HD image into which the divided images are inserted to a transmission path; and on a receiving side, an HD decoder configured to expand the image received via the transmission path, and a receiving-side image processing unit configured to extract and combine the divided images from the text telop region in the expanded HD image to generate an output SD image, output the output SD image to a first display unit, and output the expanded HD image from which the divided images have been removed as an output HD image to a second display unit.

In the video monitoring system, the transmitting-side image processing unit may divide the SD image into a plurality of images in a horizontal direction and rotate the divided images by 90 degrees, and the receiving-side image processing unit may extract the divided images, rotate the divided images by 90 degrees in a direction opposite to the rotation direction in the transmitting-side image processing unit, and combine the divided images in the horizontal direction to generate the output SD image.

The video monitoring system may further comprise: on the transmitting side, a transmission unit configured to transmit an inputted text data, and on the receiving side, a receiving unit configured to output a received text data to the receiving-side image processing unit, wherein the receiving-side image processing unit converts the text data into an image, and superimposes and outputs the image on a text telop region of the output HD image.

In accordance with the present invention, in the video monitoring system including the HD camera for capturing an HD image and an SD camera for capturing an SD image, on the transmitting side, the transmitting-side image processing unit generates a plurality of divided images by dividing the SD image and inserts the divided images in the text telop region of the HD image, and the HD encoder compresses and outputs the HD image into which the divided images are inserted to the transmission path. Further, on the receiving side, the HD decoder expands the image received through the transmission path, and the receiving-side image processing unit extracts and combines the divided images from the text telop region of the expanded HD image, generates and outputs an output SD image to the first display unit, and outputs, as the output HD image, the expanded HD image from which the divided images are removed to the second display unit. Therefore, the SD image can be transmitted together with the HD image without the SD encoder and the SD decoder, which makes it possible to simplify the configuration of the system and improve the transmission efficiency.

Further, in accordance with the present invention, on the transmitting side, the transmission unit transmits the inputted text data, and on the receiving side, the receiving unit outputs the received text data to the receiving-side image processing unit. The receiving-side image processing unit converts the text data into the image and superimposes and outputs the image on the text telop region of the output HD image. Therefore, even when the SD images inserted into the text telop region is transmitted, the text telop can be displayed on the image, and the transmission data amount can be considerably reduced compared to when the text telop is transmitted as the image data from the transmitting side.

DETAILED DESCRIPTION OF THE EMBODIMENTS

Hereinafter, an embodiment of the present invention will be described in detail with reference to the accompanying drawings.

Outline of Embodiment

In a video monitoring system according to an embodiment of the present invention which includes an HD camera for capturing an HD image and an SD camera for capturing an SD image, on a transmitting side, the SD image that has been subjected to the division/rotation processing is superimposed on a text telop region of the HD image and the SD image is transmitted together with the HD image, and on a receiving side, the SD image is extracted from the received HD image and rotation/combining processing is performed on the extracted SD image to output the RD image and the SD image. Since the HD image and the SD image can be transmitted together only by using the HD encoder and the HD decoder, the configuration of the system can be simplified, and the transmission efficiency can be improved.

Further, in the video monitoring system according to the embodiment of the present invention, in the case of transmitting information on the text telop, text data is transmitted from the transmitting side, and on the receiving side, the received text data is converted into an image, and the image is superimposed on the text telop region of the HD image to be outputted. Therefore, even when the SD image data is transmitted together with the HD image, the text telop can be inserted into the HD image.

Figure 1:
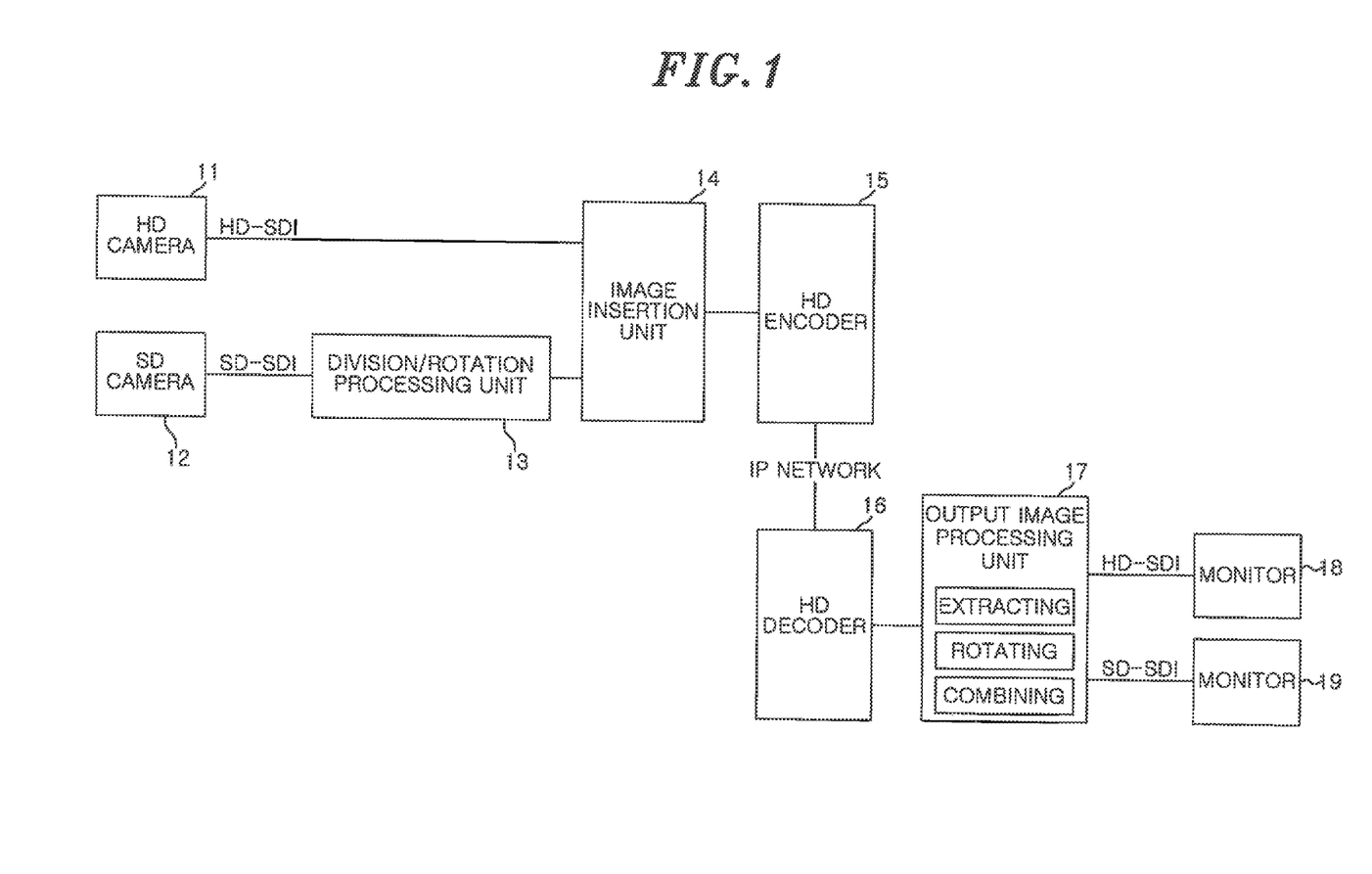
FIG. 1 is a block diagram showing a configuration of a video monitoring system according to an embodiment.

(Configuration of the Video Monitoring System According to an Embodiment: FIG. 1)

The configuration of the video monitoring system (hereinafter, referred to as "present system") according to an embodiment will be described with reference to FIG. 1.

FIG. 1 is a configuration block diagram of the present system.

As shown in FIG. 1, the present system, on a transmitting side, includes an HD camera 11, an SD camera 12, a division/rotation processing unit 13, an image insertion unit 14 and an HD encoder 15, and on a receiving side, includes an HD decoder 16, an output image processing unit 17 and monitors (display units) 18 and 19.

The respective units of the present system will be described.

First, the configuration on the transmitting side will be described.

The HD camera 11 captures an HD image and outputs an HD signal to an HD-SDI. The HD-SDI is an interface cable for HD signals. The HD image has, e.g., 1920×1080 (pixels).

The HD image has a region (text telop region) for superimposing text telop at the top and the bottom of the screen. The text telop region has, e.g., 1980×90 (pixels). In the present system, an SD image is transmitted by using this region.

The SD camera 12 captures an SD image and outputs an SD signal to an SD-SDI. The SD-SDI is an interface cable for SD signals. The SD image has, e.g., 720×480 (pixels).

The division/rotation processing unit 13 divides and rotates the SD image captured by the SD camera 12.

The image insertion unit 14 receives the HD image and the divided and rotated SD images, and inserts the SD images into the text telop region of the HD image.

The processing of the division/rotation processing unit 13 and the image insertion unit 14 will be described later. The combination of the division/rotation processing unit 13 and the image insertion unit 14 corresponds to a transmitting-side image processing unit to be described in the claims.

The HD encoder 15 encodes and compresses the HD image into which the SD images are inserted as in the conventional case, and outputs the compressed image to a transmission path such as an IP network or the like.

Next, the configuration on the receiving side will be described.

The HD decoder 16 receives the compressed HD image via the IP network, and decodes and expands the image.

The output image processing unit 17 receives the expanded HD image and reproduces the SD image by extracting, rotating and combining the SD images inserted in the HD image. Then, the HD image from which the SD image has been removed is outputted to the HD-SDI, and the rotated and combined SD image is outputted to the SD-SDI. The output image processing unit 17 corresponds to a receiving-side image processing unit to be described in the claims.

The monitor 18 displays the HD image inputted from the HD-SDI, and corresponds to a second display unit to be described in the claims. The monitor 19 displays an SD image inputted from the SD-SDI, and corresponds to a first display unit to be described in the claims.

The operation of the present system will be described.

(Operation on the Transmitting Side)

On the transmitting side, the HD image captured by the HD camera 11 is inputted into the image insertion unit 14 via the HD-SDI. On the other hand, the SD image captured by the SD camera 12 is inputted into the division/rotation processing unit 13 via the SD-SDI.

Figure 2:
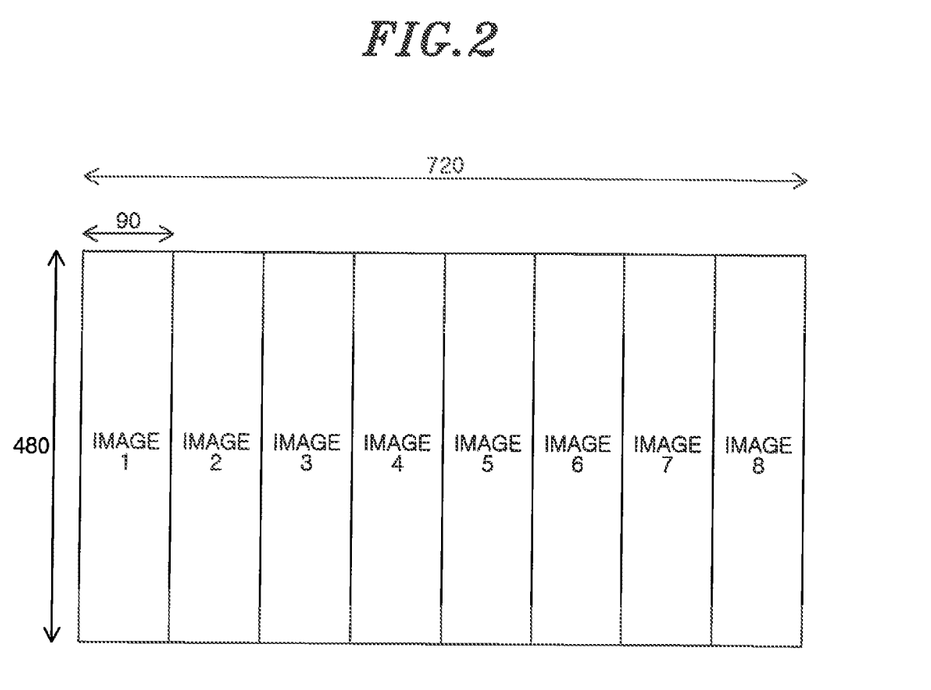
FIG. 2 explains division processing of an SD image.

(Division of the SD Image: FIG. 2)

SD image division processing of the division/rotation processing unit 13 will be described with reference to FIG. 2. FIG. 2 explains the SD image division processing.

As shown in FIG. 2, the division/rotation processing unit 13 divides an inputted SD image (720×480) into eight parts in a horizontal direction (longitudinal direction) (images 1 to 8). Each of the divided images has a dimension of 90×480 (pixels), and a horizontal length 90 is identical to a vertical length of the text telop region of the HD image.

Figure 3:
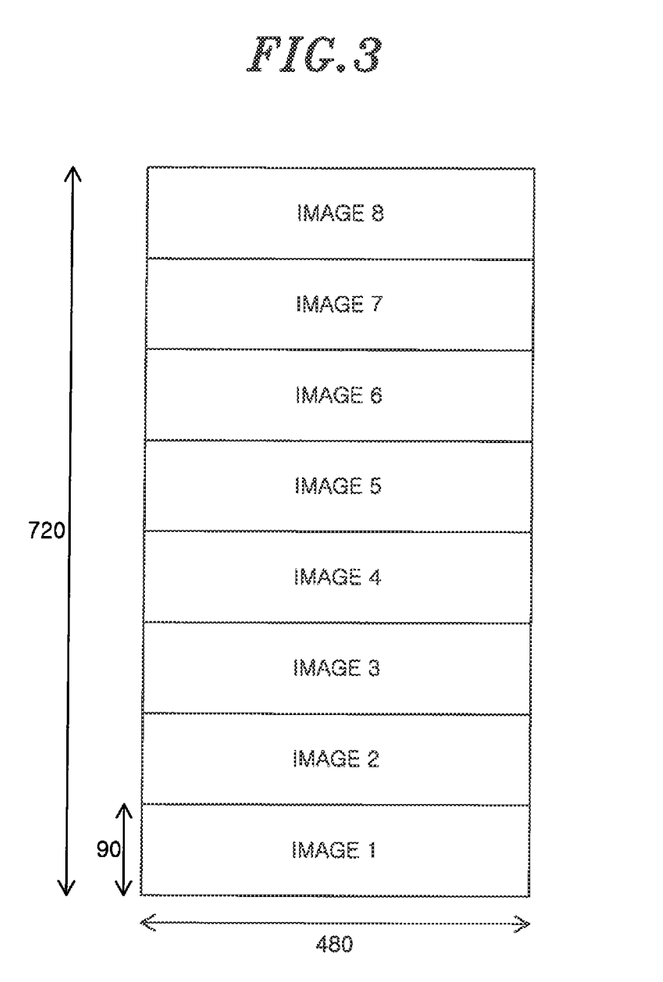
FIG. 3 explains rotation processing of an SD image.

(Rotation of the SD Image: FIG. 3)

Next, SD image rotation processing will be described with reference to FIG. 3. FIG. 3 explains the SD image rotation processing.

The division/rotation processing unit 13 divides the SD image and rotates the divided images to the left by 90 degrees, as shown in FIG. 3. Accordingly, each of the divided images has a dimension of 480×90 (pixels). The divided images may be rotated to the right.

In the division/rotation processing of the SD image, the rotation processing may be performed first. In that case, in the division processing, the rotated SD image is divided into eight parts in a vertical direction, thereby obtaining the same images 1 to 8 as those shown in FIG. 3.

The SD image is not necessarily divided into eight parts, and may be divided into a required number of parts. The divided images may have the same dimension or may have different dimensions.

Figure 4:
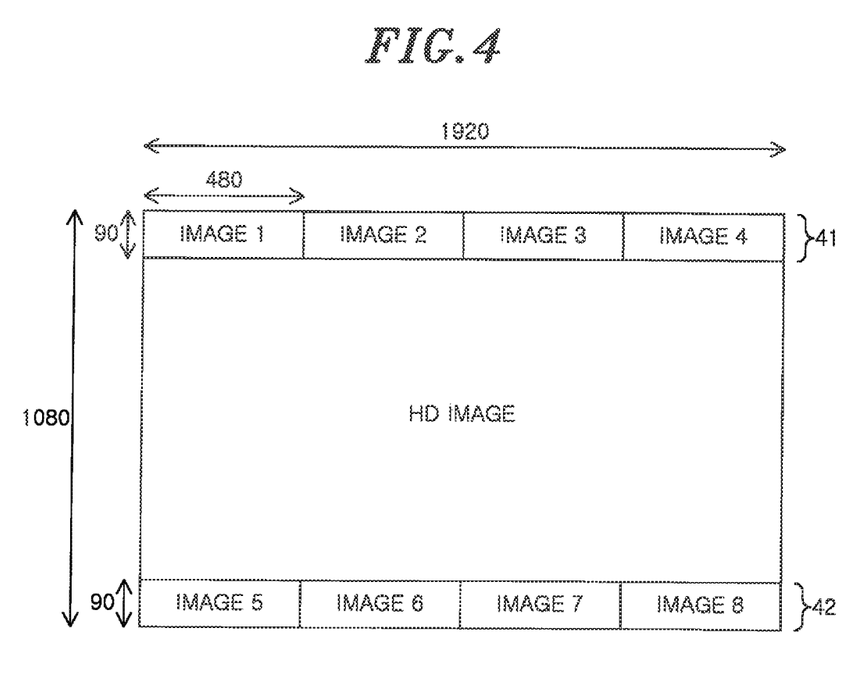
FIG. 4 explains insertion processing of an SD image.

(Insertion of the SD Image: FIG. 4)

Next, SD image insertion processing of by the image insertion unit 14 will be described with reference to FIG. 4. FIG. 4 explains the SD image insertion processing.

As shown in FIG. 4, the image insertion unit 14 receives the divided/rotated SD images shown in FIG. 3 and inserts the divided images (images 1 to 8) into the text telop region of the HD image.

In the present system, the SD images are inserted into an upper region of 1920×90 (pixels) and a lower region of 1920×90 (pixels) in the information region of the HD image.

Here, the images 1 to 4 among the divided SD images are sequentially inserted from the left into a text telop region 41 (the first line to the $90^{th}$ line from the top) provided at the upper part of the HD image, and the images 5 to 8 are sequentially inserted from the left into a text telop region 42 (from the $991^{st}$ line to the $1080^{th}$ line) provided at the lower part of the HD image. Therefore, 1920×900 (pixels) of the HD image captured by the HD camera 11 except the top and the bottom are transmitted.

(Transmission)

The HD image into which the SD images are inserted is encoded and compressed as one HD image by the HD encoder 15, and transmitted via the IP network.

The insertion positions of the divided SD images are merely an example without being limited thereto.

(Operation on the Receiving Side)

On the receiving side, the HD image is received via the IP network, and decoded and expanded by the HD decoder 16. Accordingly, the HD image into which the SD images are inserted (see FIG. 4) is inputted into the output image processing unit 17.

The output image processing unit 17 reproduces the HD image and the original SD image correspondingly to the processes performed by the division/rotation processing unit 13 and the image insertion unit 14 on the transmitting side.

Therefore, the output image processing unit 17 is provided with an image extracting unit, an image rotating unit, and an image combining unit (respectively designated as "extracting," "rotating" and "combining" in the drawing).

Specifically, as shown in FIG. 4, the image extraction unit of the output image processing unit 17 extracts the text telop regions 41 and 42 from the expanded HD image, and extracts the SD images, inserted into the corresponding regions, in the size of 480×90 from each divided image.

The image extraction unit of the output image processing unit 17 extracts the divided images 1 to 4 of the SD image from the text telop region 41 of the HD image and extracts the divided images 5 to 8 from the text telop region 42.

The extracted divided images are rotated to the right by 90 degrees by the image rotating unit of the output image processing unit 17, arranged in the order of the image 1, the image 2, . . . the image 8 from the left, and combined by the image combining unit. Accordingly, the original SD image is reproduced. When the arrangement of the divided images is different from that in FIG. 4, the image combining unit stores the arrangement information of the divided images in advance, and rearranges and combines the divided images.

The HD image (output HD image) from which the SD image has been removed is outputted from the output image processing unit 17 and displayed on the monitor 18 via the HD-SDI. The reproduced SD image (output SD image) is outputted and displayed on the monitor 19 via the SD-SDI.

In this manner, the operation of the present system is performed.

Therefore, in the present system, the SD encoder on the transmitting side and the SD decoder on the receiving side are not required, which makes it possible to simplify the configuration of the system and improve the transmission efficiency.

Figure 5:
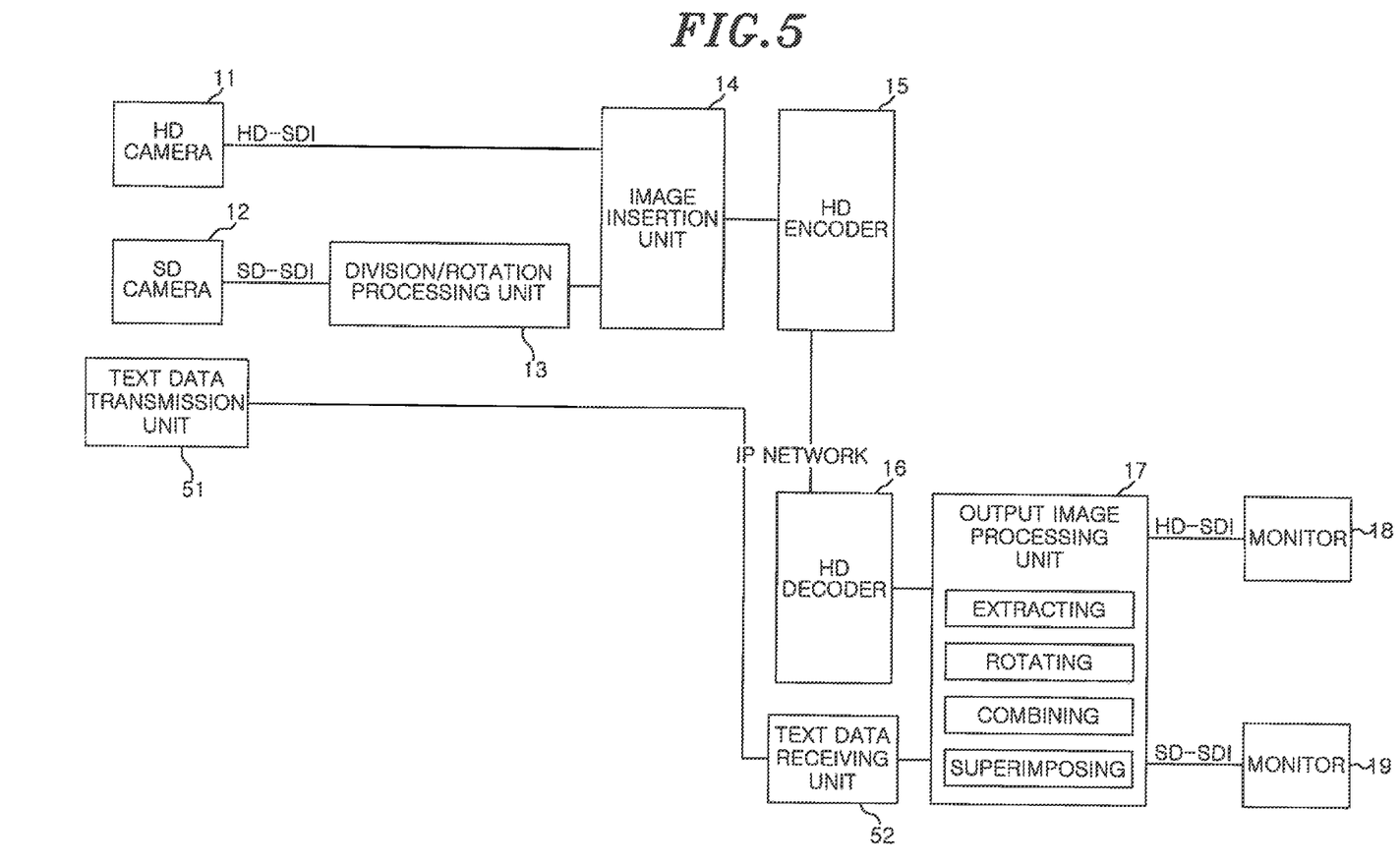
FIG. 5 explains a configuration for inserting texts.

(Insertion of Texts: FIG. 5)

Next, the case of inserting texts into the HD image will be described with reference to FIG. 5. FIG. 5 explains a configuration in the case of inserting texts.

In the present system, the divided SD images are inserted into the text telop region of the HD image. Therefore, texts cannot be superimposed on the image unlike the conventional case.

Accordingly, in the present system, as shown in FIG. 5, a text data transmission unit 51 is provided on the transmitting side, and a text data receiving unit 52 is provided on the receiving side.

The text data transmission unit 51 transmits, as text data, text information to be inserted into the HD image via the IP network.

The text data receiving unit 52 receives the text data via the IP network and outputs the text data to the output image processing unit 17.

Specifically, the text data transmission unit 51 on the transmitting side adds the HD image to be inserted and the information that specifies the display position (the upper part or the lower part) to the text data to be displayed as the text telop, and transmits it via the IP network. The information to be added includes, e.g., an HD image number and the position information that specifies the upper part or the lower part.

On the receiving side, when the text data is received by the text data receiving unit 52, the output image processing unit 17 converts the text data to image data, superimposes (arranges) the text image on the specified position (the upper part or the lower part) in the text telop region provided at the top and the bottom of the specified HD image, and outputs it to the HD-SDI.

The output image processing unit 17 is provided with a superimposing unit (designated as "superimposing" in the drawing) for converting the text data into the image and superimposing it on the HD image.

In other words, in the present system, as shown in FIG. 5, a transmission system is provided separately from the image transmission system. The transmission system inputs, edits and transmits text data on the transmitting side, and receives and outputs the text data to the output image processing unit 17 on the receiving side.

Figure 6:
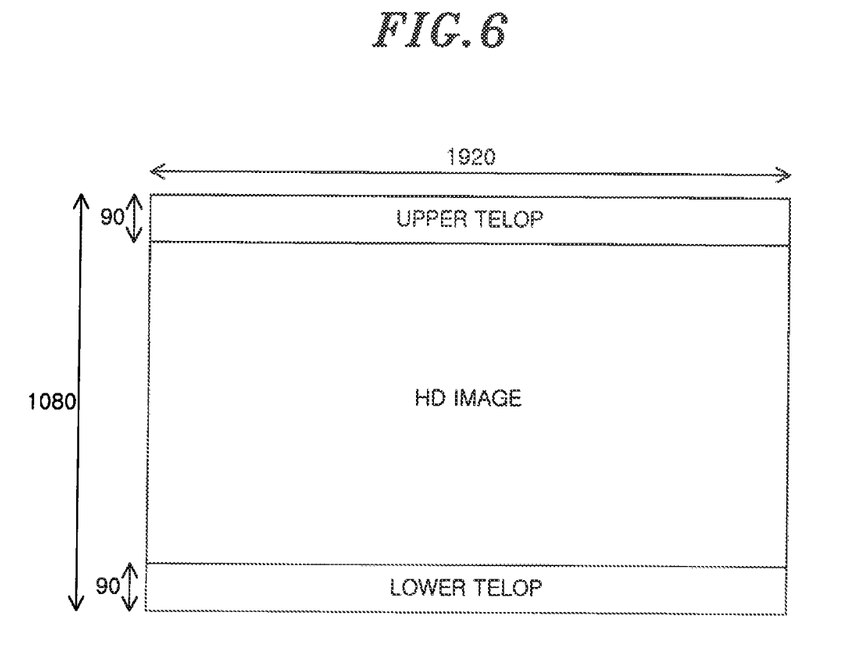
FIG. 6 explains a decoded HD image.

(Decoded HD Image: FIG. 6)

FIG. 6 explains a decoded HD image.

As shown in FIG. 6, in the HD image (output HD image) from which the SD image has been removed, the image is displayed on a region of 1920×900 (pixels) except for the top and the bottom among 1920×1080 (pixels), and the text telop is displayed on a region of 1920×90 (pixels) provided at the top and the bottom.

Accordingly, in a system in which texts are inserted into an HD image, the text telop can be displayed on the top and the bottom of the HD image even if the SD image is superimposed on the HD image.

By transmitting the text telop as the text data, the amount of transmission data can be considerably reduced compared to when the text information superimposed on the image is transmitted from the transmitting side.

Effect of the Embodiment

In accordance with the video monitoring system of the present invention which includes the HD camera 11 and the SD camera 12, on the transmitting side, the division/rotation processing unit 13 divides the SD image into eight parts in the horizontal direction and rotates them to the left by 90 degrees; the image insertion unit 14 superimposes the divided and rotated SD images on the text telop region of the HD image; the HD encoder 15 compresses the HD image on which the SD image is superimposed and transmits the compressed HD image. On the receiving side, the HD decoder 16 expands the received HD image; the output image processing unit 17 extracts the divided SD images from the text telop region of the expanded HD image, rotates them to the right by 90 degrees, rearranges and combines them to reproduce the SD image, outputs the HD image to the monitor 18, and outputs the SD image to the monitor 19. Accordingly, the SD encoder and the SD decoder become unnecessary, which makes it possible to simplify the configuration of the system and improve the transmission efficiency compared to when the SD image and the HD image are separately transmitted.

Further, in accordance with the video monitoring system according to the embodiment of the present invention, when the text telop is displayed on the HD image, on the transmitting side, the text data to which the information that specifies the text telop region in the HD image is added is transmitted. On the receiving side, the output image processing unit 17 converts the texts into the image data based on the text data, superimposes the text image data on the specified text telop region in the specified HD image, and outputs the text image data to the monitor 18. Therefore, even if the SD image inserted into the text telop region is transmitted, the text telop can be displayed on the HD image. In addition, by transmitting the text data, the amount of transmission data can be considerably reduced.

INDUSTRIAL APPLICABILITY

The present invention is suitable for a video monitoring system that can reduce costs by simplifying the configuration thereof and improve transmission efficiency.

DESCRIPTION OF REFERENCE NUMERALS

11, 71: HD camera
12, 72: SD camera
13: division/rotation processing unit
14: image insertion unit
15, 73: HD encoder
16: HD decoder
17: output image processing unit
18, 19: monitor
51: text data transmitting unit
52: text data receiving unit
74: SD encoder
75: LAN switch

What is claimed is:

1. A video monitoring system including an HD camera configured to capture an HD (high definition) image and an SD camera configured to capture an SD (standard definition) image, the system comprising:
    on a transmitting side, a transmitting-side image processing unit configured to divide the SD image into a plurality of images and insert the divided images into a text telop region of the HD image, and an HD encoder configured to compress and output the HD image into which the divided images are inserted to a transmission path; and
    on a receiving side, an HD decoder configured to expand the image received via the transmission path, and a receiving-side image processing unit configured to extract and combine the divided images from the text telop region in the expanded HD image to generate an output SD image, output the output SD image to a first display unit, and output the expanded HD image from which the divided images have been removed as an output HD image to a second display unit.

2. The video monitoring system of claim 1, wherein the transmitting-side image processing unit divides the SD image into a plurality of images in a horizontal direction and rotates the divided images by 90 degrees, and
    the receiving-side image processing unit extracts the divided images, rotates the divided images by 90 degrees in a direction opposite to the rotation direction in the transmitting-side image processing unit, and combines the divided images in the horizontal direction to generate the output SD image.

3. The video monitoring system of claim 1, further comprising: on the transmitting side, a transmission unit configured to transmit an inputted text data, and
    on the receiving side, a receiving unit configured to output a received text data to the receiving-side image processing unit,
    wherein the receiving-side image processing unit converts the text data into an image, and superimposes and outputs the image on a text telop region of the output HD image.

4. The video monitoring system of claim 2, further comprising: on the transmitting side, a transmission unit configured to transmit an inputted text data, and
    on the receiving side, a receiving unit configured to output a received text data to the receiving-side image processing unit,
    wherein the receiving-side image processing unit converts the text data into an image, and superimposes and outputs the image on a text telop region of the output HD image.

* * * * *